(12) United States Patent
McCarron et al.

(10) Patent No.: US 9,864,608 B2
(45) Date of Patent: *Jan. 9, 2018

(54) CLIENT AUTHENTICATION DURING NETWORK BOOT

(71) Applicant: Microsoft Technology Licensing, LLC, Redmond, WA (US)

(72) Inventors: Christopher McCarron, Hartford, CT (US); Varugis Kurien, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,145

(22) Filed: Mar. 7, 2016

(65) Prior Publication Data

US 2016/0188349 A1    Jun. 30, 2016

Related U.S. Application Data

(63) Continuation of application No. 14/645,291, filed on Mar. 11, 2015, now Pat. No. 9,306,945, which is a
(Continued)

(51) Int. Cl.
G06F 21/00    (2013.01)
G06F 9/44    (2006.01)
(Continued)

(52) U.S. Cl.
CPC ............ *G06F 9/4416* (2013.01); *G06F 3/067* (2013.01); *G06F 3/0622* (2013.01); *G06F 3/0659* (2013.01); *G06F 12/1408* (2013.01); *G06F 21/30* (2013.01); *G06F 21/305* (2013.01); *H04L 9/30* (2013.01); *H04L 9/32* (2013.01); *H04L 9/3215* (2013.01); *H04L 9/3271* (2013.01); *H04L 63/0428* (2013.01); *H04L 63/0869* (2013.01); *H04L 67/10* (2013.01);
(Continued)

(58) Field of Classification Search
None
See application file for complete search history.

(56) References Cited

U.S. PATENT DOCUMENTS 7,207,039 B2 * 4/2007 Komarla ............... G06F 9/4416
                                              713/2
7,383,440 B1 * 6/2008 Miller, III ............ H04L 9/3271
                                              709/217
(Continued)

OTHER PUBLICATIONS

Daly, David, et al. "Base operating system provisioning and bringup for a commercial supercomputer." Parallel and Distributed Processing Symposium, 2007. IPDPS 2007. IEEE International. IEEE, 2007.*

Primary Examiner — Madhuri Herzog
(74) Attorney, Agent, or Firm — Michael B. Dodd; Dodd Law Group

(57) ABSTRACT

A mechanism for performing a network boot sequence and provisioning a device may generate a command by a server and have the command executed by the device. The command may be used to verify the authenticity of the device, and may be used to establish ownership of the device. After authenticity and, in some cases ownership is established, bootable software may be downloaded and executed. The device may be provisioned with software applications.

20 Claims, 3 Drawing Sheets

Related U.S. Application Data continuation of application No. 14/034,442, filed on Sep. 23, 2013, now Pat. No. 8,895,496, which is a continuation of application No. 12/113,952, filed on May 2, 2008, now Pat. No. 8,543,799.

(51) Int. Cl.
| | | |
|---|---|---|
| *G06F 21/30* | (2013.01) | |
| *H04L 9/32* | (2006.01) | |
| *H04L 29/06* | (2006.01) | |
| *G06F 3/06* | (2006.01) | |
| *G06F 12/14* | (2006.01) | |
| *H04L 9/30* | (2006.01) | |
| *H04L 29/08* | (2006.01) | |

(52) U.S. Cl.
 CPC ............... *G06F 2212/1052* (2013.01); *H04L 2209/127* (2013.01); *H04L 2209/80* (2013.01)

(56) References Cited

U.S. PATENT DOCUMENTS

| 7,882,345 B1* | 2/2011 | Christensen | G06F 9/4416 |
| | | | 709/217 |
| 2003/0210657 A1* | 11/2003 | Mahajan | H04L 29/06 |
| | | | 370/310 |
| 2008/0183812 A1* | 7/2008 | Paul | G06F 9/4416 |
| | | | 709/203 |
| 2009/0129597 A1* | 5/2009 | Zimmer | G06F 21/575 |
| | | | 380/277 |

* cited by examiner

CLIENT AUTHENTICATION DURING NETWORK BOOT

CROSS REFERENCE TO RELATED APPLICATIONS

This application claims the benefit of and priority to U.S. patent application Ser. No. 14/645,291, entitled "Client Authentication During Network Boot", filed Mar. 11, 2015 by Christopher McCarron et al., the entire contents of which are expressly incorporated by reference. That application claims the benefit of and priority to U.S. patent application Ser. No. 14/034,422, now U.S. Pat. No. 8,990,090, entitled "Client Authentication During Network Boot", filed Sep. 23, 2013 by Christopher McCarron et al., the entire contents of which are expressly incorporated by reference. That application claims the benefit of and priority to U.S. patent application Ser. No. 12/113,952, now U.S. Pat. No. 8,543,799, entitled "Client Authentication During Network Boot", filed May 2, 2008 by Christopher McCarron et al., the entire contents of which are expressly incorporated by reference.

BACKGROUND

Network boot is a mechanism where a device, connected to a network, may connect to a network server and download software to boot the device. In many cases, an operating system may be transmitted across the network and the device may begin operations through software provided by the network server. The server may provision the device with various software applications and may enable the device to begin operations.

Network boot techniques may enable a device to be configured and operated from a remote location. The server that provides the bootable software and operating system may determine the configuration of executable code and may change the applications and settings each time the device is rebooted.

SUMMARY

A mechanism for performing a network boot sequence and provisioning a device may generate a command by a server and have the command executed by the device. The command may be used to verify the authenticity of the device, and may be used to establish ownership of the device. After authenticity and, in some cases ownership is established, bootable software may be downloaded and executed. The device may be provisioned with software applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
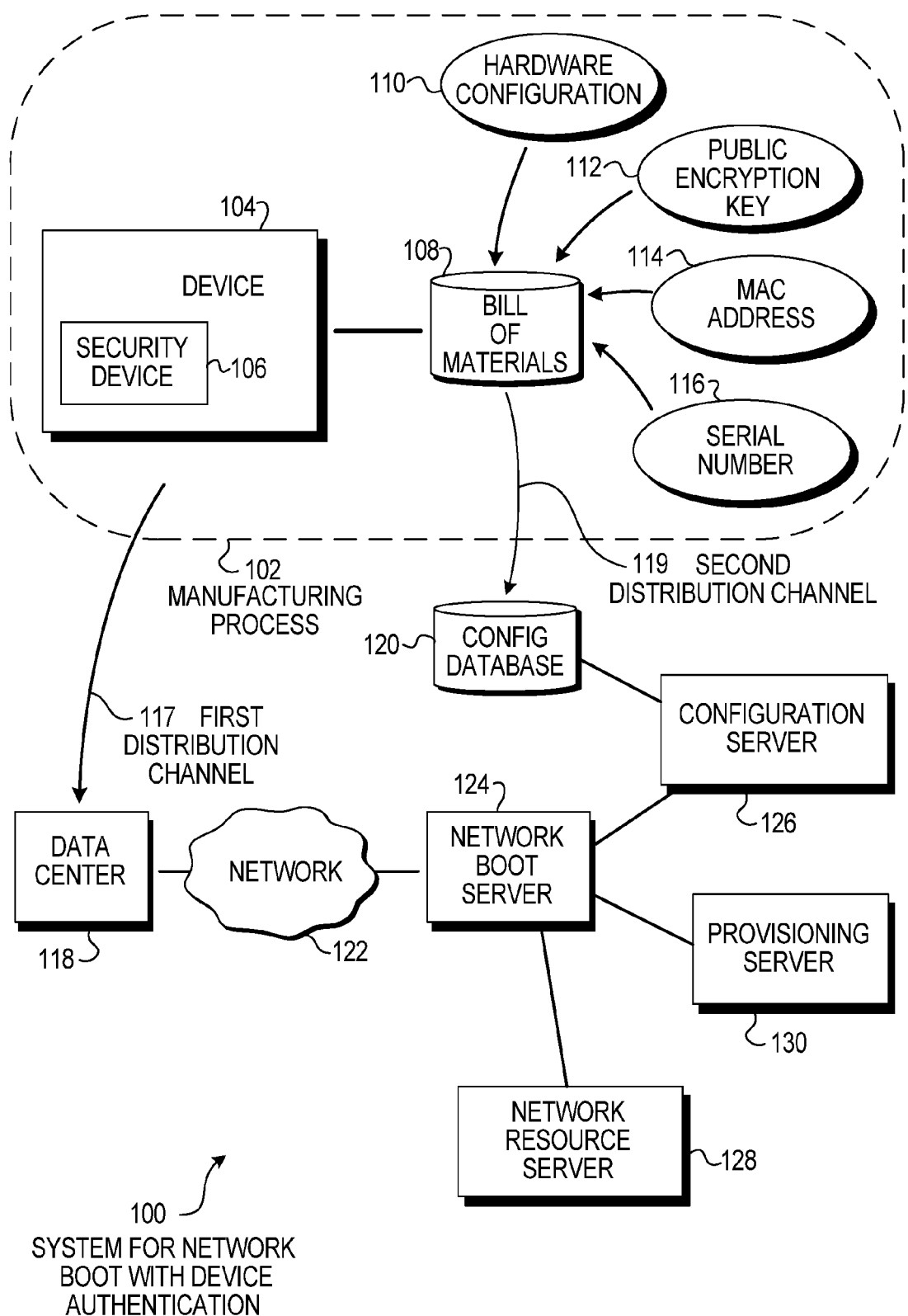
FIG. 1 is a diagram illustration of an embodiment showing a system for network boot with device authentication.

A network boot procedure may authenticate a device to a server, and the server to the device during the startup phase of a boot procedure. The authenticated procedure may enable network boot procedures to be performed with assurance, and may enable trusted network boot procedures to be performed across an open network such as the Internet.

In a typical use scenario, a device may be manufactured with a Trusted Platform Module or other component that may have a public/private encryption key and other security components embedded in the device. When the device is manufactured, the public key associated with the device may be stored in a database that is transferred to the owner of the device. The owner may cable the device to a network and start the device.

When the device first starts, it may be configured to begin a network boot sequence. As part of the sequence, the device may send a broadcast network request for a server capable of sending bootable code that may be used to operate the device.

The server may use the public encryption key to encrypt one or more commands and send the commands to the device. The device may decrypt the commands, execute the commands, and return a message to the server. In order to decrypt the command, the device may use the private encryption key. Thus, a response from the command may authenticate the device to the server. Such an authentication may assure that an interloping device is not attempting to improperly obtain software and data from the server.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with network boot with device authentication. Embodiment 100 is a simplified example of a device that may perform a network boot sequence where the device is authenticated to a network boot server. The network boot server may use a public encryption key to encrypt various commands at the beginning of a network boot interaction, and when the device successfully decrypts and executes the commands, the device is authenticated to the network boot server.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a simplified example of a system where network boot requests may be authenticated for a requesting device. Such a system may be useful in a data center situation where many devices, such as blade servers or other rack mounted servers are installed and operated en masse. In many data centers, many tens, hundreds, or even thousands of devices may be installed and operated. Prior to operating each of the devices, the devices may be loaded with an operating system and various applications.

When high volumes of devices are to be installed and configured, a network boot sequence may be used to boot a device over a network from a network boot server. The device being installed may initiate a network boot request that may be received by a network boot server. The network boot server may use a public encryption key previously stored on the server to encrypt a message or command for the device. The device, having the matching private encryption key to the public encryption key, may decrypt the command and execute the command. Since only the device with the private encryption key may successfully decrypt the command, a correct and cryptographically verifiable response from the command may authenticate the device to the server.

Authenticating the network boot device may provide protection against an interloper device. If an unauthorized or interloping device were permitted to boot using the network boot server, the unauthorized device may obtain licensed software in the form of operating systems and applications, as well as operate on the network and potentially receive data that may be sensitive, classified, or otherwise controlled.

In a scenario with a malicious interloper, the malicious device may pose as a normal device on the network, receive licensed software or other controlled data, and then be disconnected. The malicious device may then be analyzed offline to recover the data and other software.

Another scenario may be where devices may be installed improperly, located at the wrong facility, or may be improperly configured for a specific task. By causing each device to be authenticated, the proper software configurations may be performed in accordance with a configuration management database that may be used to administer the devices.

One more use scenario may be where the security of software and data on the network may be paramount. However, the devices may be installed and cabled to the network using a third party contractor or other workers who may not have authorization to access the data. The unauthorized workers may perform the physical installation of the devices to the network, but the network boot mechanism may ensure that the installation workers cannot access the controlled data maliciously or by mistake.

The authentication mechanism starts with the manufacturing process 102. In the manufacturing process 102, a device 104 may be created with an internal security device 106. In embodiments using current technology, the security device 106 may be a Trusted Platform Module.

A Trusted Platform Module offers various mechanisms for secure generation of cryptographic keys, the ability to limit the use of cryptographic keys, as well as a hardware random number generator. A Trusted Platform Module may also include capabilities such as remote attestation and sealed storage. Remote attestation creates a nearly unforgeable hash key summary of the hardware and software associated with the device. To what extent the software is being summarized is decided by the software that is encrypting the data. Such a system may allow a third party to verify that the software has not been changed. Sealing is a mechanism that may encrypt data in such a way that it may be decrypted only if the TPM releases the right decryption key, which it only does if the exact same software is present as when it encrypted the data. Binding may encrypt data using the TPM's endorsement key or public encryption key, which may be a unique set of public/private encryption keys burned into the TPM device during its production.

A Trusted Platform Module can be used to authenticate hardware devices. Each TPM chip may have a unique and secret RSA key burned in during the production, and the TPM chip may be capable of performing platform authentication.

Other embodiments may use different mechanisms for authentication. Trusted Platform Modules is but one mechanism by which a public key and private key encryption system may be embedded in a device and used for authentication during a network boot process.

When the device 104 is constructed or configured, a bill of materials 108 may also be created. The bill of materials 108 may include various data related to the device 104, such as the hardware configuration 110, a public encryption key 112, a Media Access Control (MAC) address 114, a serial number 116, and other identification or descriptive information. The bill of materials 108 may be used for several other applications, such as a configuration management database application that may be used for monitoring and controlling several devices.

The hardware configuration 110 may be a description of the various hardware components that make up the device 104. For example, hardware configuration 110 may include a description of the type of processor, amount of random access memory, various busses, number and capacity of disk drives, and various peripheral devices.

The public encryption key 112 may be the public encryption key from the public/private encryption key pair stored in a Trusted Platform Module or another component within the device 104.

The MAC address 114 may be an address associated with a network interface card or other component within the device 104. The MAC address 114 may be used to identify the device 104 on a network. A serial number 116 may be any other identifier that may be associated with the device 104. The serial number 116 may be a processor serial number or some other unique identification that is associated with the device 104. In some instances, a Globally Unique Identification (GUID) associated with the device or a component attached to the device may be used as an identifier.

The device 104 may be installed into a data center 118 or some other physical installation using a first distribution channel 117.

The bill of materials 108 may be installed into a configuration database 120 through a second distribution channel 119.

The first distribution channel 117 may be a normal channel used for purchasing, shipping, and installing the device 104 into the place where the device 104 is to be used. In the example of embodiment 100, the device 104 may be installed in a data center 118. In other embodiments, a device such as a desktop or laptop computer may be installed in a company or enterprise in various locations. A desktop computer may be installed in a user's office, for example.

The device 104 may be any type of network connected device. In some embodiments, the device 104 may be a set top box for connecting to a cable television or satellite television distribution network. In other devices, the device 104 may be a wireless device such as a mobile telephone or personal digital assistant.

The second distribution channel 119 may be a different and trusted distribution channel for the bill of materials 108. The second distribution channel 119 may be a physical distribution channel such as a currier or delivery where the bill of materials 108 may be delivered on a DVD or other computer readable medium. In some cases, the second distribution channel may be a delivery on paper or other human readable medium. In many cases, the second distribution channel 119 may be a network connection where the bill of materials 108 may be transmitted to a customer location using messaging, email, or some other electronic format. In some cases, such communication may be encrypted and authenticated using one-way or two-way authentication.

When the device 104 is installed in the data center 118, the device 104 may initiate a network boot sequence across the network 122 to a network boot server 124. The network boot server 124 may receive a request that may include an identifier such as a MAC address, Internet Protocol (IP) address, or some other identifier. Using the configuration server 126, the public encryption key 112 may be retrieved for the device 104 through the configuration database 120.

The public encryption key 112 may be used to encrypt data or commands to send to the device 104 so that only the device 104 may be able to decrypt and operate on the encrypted message.

By encrypting a command and transmitting the command to the device 104 in response to a network boot request, the network boot server 124 may authenticate the device 104 when the device 104 successfully decrypts, executes, and responds to the command. The command does not have to be an explicit command to authenticate, but merely any command that elicits a response, when encrypted using the public encryption key and transmitted to the device 104 may serve to authenticate the device.

Once the device is authenticated, the network boot server 124 may interface with a network resource server 128 and provisioning server 130 to download an appropriate set of bootable executable code, as well as an operating system and other applications.

The authentication of the device 104 to the network boot server 124 may be assured by the use of the public encryption key 112. The authentication of the network boot server 124 to the device 104 may be assured by the security of the second distribution channel 119. When the second distribution channel 119 is secure, the device 104 may not be connected to an improper or malicious network boot server.

In many embodiments, the security device 106 within the device 104 may have an ownership function. The ownership function may define which servers are permitted to perform various functions on the device 104, and such functions may include serving a network boot request. Ownership may be established and queried through various commands that may be transmitted to the device 104 and executed by the security device 106.

When a brand new device 104 is installed and turned on for the first time, there may be no ownership defined for the device. During an initial network boot sequence, the network boot server 124 may query the ownership and establish the network boot server 124 as having ownership of the device 104. The ownership designation may prevent other devices from accessing specific functions and, in some cases, may disable other devices from being able to perform network boot sequences with the device 104.

In many enterprise embodiments where hundreds or even thousands of devices may be managed, various administrative servers may be used to manage the devices. A configuration server may manage a configuration management database (CMDB) or other repositories may contain metadata related to various components in an information system. In many embodiments, the information within the configuration management database may be used to deploy and configure devices within a network. The configuration server 126 may also have various agents, crawlers, or other mechanisms for discovering devices and configuration of devices on a network and keeping the database up to date.

In many embodiments, the configuration database 120 may contain technical information relating to the various devices. Such information may include hardware and software configuration descriptions. The configuration database 120 may also include ownership and relationship information for various devices. In many embodiments, complex relationships may exist across networks between devices and such relationships may be captured and managed using the configuration database 120.

The network resource server 128 may serve to authenticate devices and authorize various functions of the devices. In many embodiments, the network resource server 128 may define policies that are distributed across groups and devices on a network to control the behavior of the devices.

The provisioning server 130 may contain a repository of operating systems, applications, and other components that may be downloaded and installed by the network boot server 124.

In some embodiments, the functions of the configuration server 126, network resource server 128, and provisioning server 130 may be combined into one server, or may be functions that represent several different servers.

Figure 2:
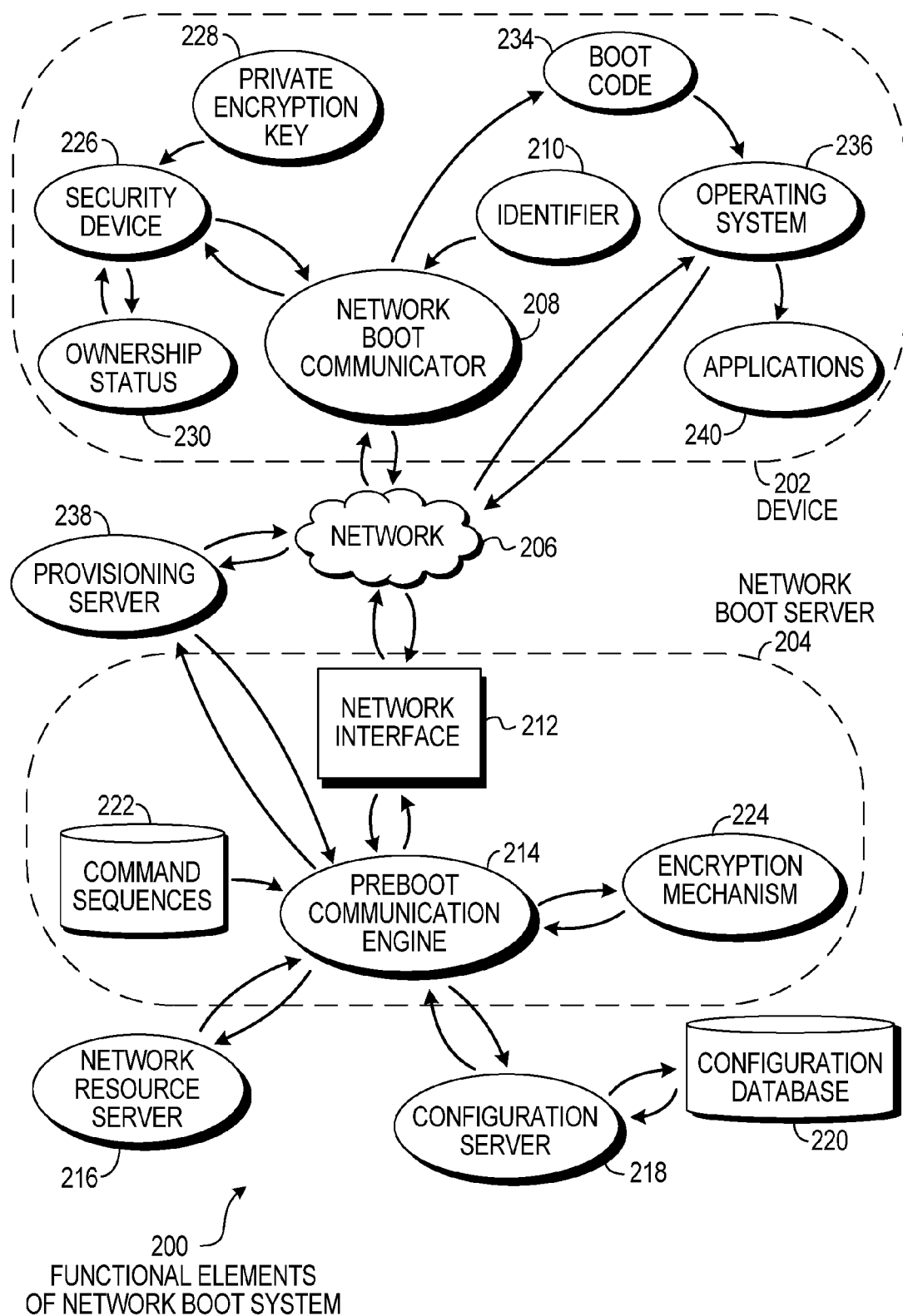
FIG. 2 is a diagram illustration of an embodiment showing functional elements of a network boot system.

FIG. 2 is a diagram of an embodiment 200 showing functional components of a system with network boot with device authentication. Embodiment 200 is a simplified example of functional elements that may perform a network boot sequence where the device is authenticated to a network boot server.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates functional components that may be used to perform a network boot sequence of a device 202 with a network boot server 204 over a network. The device 202 may be any type of device that may use software to perform its functions. In a datacenter environment, the device 202 may be one server device that is installed in a large rack of servers, such as a blade server. Such a server may be one of hundreds or thousands within a datacenter, and network boot techniques may be used to provision and manage the servers.

In another example, the device 202 may be a set top box that is attached to a cable television or satellite television distribution network. In still another example, the device 202 may be a network routing device, wireless access point, or other component used within a network or at a network edge. In yet another example, the device 202 may be a wireless device such as a mobile phone, portable personal digital assistant, handheld data collection device, or any other device that operates using software.

The network 206 may be any type of communications network. In a datacenter or corporate computing network, a typical network may be an Ethernet based hardwired network. A DOCSIS based cable television network or satellite network may have relatively fast download speeds compared to upload speeds. Wireless networks use various technologies for network communication, including cellular telephony, point to multipoint fixed wireless, mesh networks, or other technologies. Each network may have different capacities, features, and other characteristics.

In some embodiments, a network may be a multi-modal. For example, a device using a satellite distribution network may use a satellite connection for downstream or incoming data while a telephone modem connection or hardwired Internet connection may be used for outgoing or upstream data.

Because authentication may be used during the network boot process, some embodiments may use portions of the Internet or other open or unsecured network to communicate. In an enterprise network, the devices on the network may have at least a low level of trust, as physical access to the network may be controlled. However, some networks may be at least partially exposed to the Internet and may be susceptible to interlopers or devices masquerading as either the device 202 or the network boot server 204. Using network boot techniques with the authentication mechanisms described herein may enable network boot technologies to be applied in many cases where unsecured network boot may pose a security risk.

For example, a new cellular phone may be connected to a cellular telephone network and may perform a network boot request over the cellular telephone network. In some cases, a new cellular phone may be connected to personal computer and may be provisioned through the computer, where the personal computer acts as a server to the cellular phone, and may communicate through the Internet to a remote provisioning server. The authenticity of the cellular phone may be assured by using a security device and the embedded private encryption key embedded in the phone.

The network boot server 204 may be a server device connected to the network 206 and in communication with the device 202. In some embodiments, the network boot server 204 may perform many or all of the functions for responding to a network boot request, including provisioning the device 202. In other embodiments, a network boot request may be captured by one server and redirected to the network boot server 204. Such capturing and routing architectures may be used for load balancing or for directing a request to a network boot server with the appropriate capabilities to handle the request.

The device 202 may contain a network boot communicator 208 that may create an initial network boot request that may contain an identifier 210. The network boot request may be one of the initial actions that are performed by the device 202 when the device 202 is turned on. The network boot request may include a broadcast transmission over the network 206 that may start an interaction with the network boot server 204.

In some embodiments, the network boot request may be broadcast to find any server capable of providing a network boot service. Such an embodiment may be useful in a corporate network where several network boot servers are present and generally trusted.

In other embodiments, the device 202 may be configured to transmit a network boot request to a specific address on the network 206 to find the network boot server 204. In some cases, the specific address may be to a distribution server that may redirect the network boot request to the network boot server 204.

The identifier 210 may be any descriptor or other unique identifier for the device 202. The identifier may be a Media Access Control (MAC) address, embedded serial number, Globally Unique Identification (GUID), or some other identification.

In some cases, the identification may be an Internet Protocol (IP) address. In many cases, an IP address may be assigned to a specific physical connection to a network or assigned through DHCP or other address allocation technologies when the device 202 establishes a network presence, but the IP address may or may not be embedded within the device 202 itself. The IP address may serve as an identifier in some cases.

In many embodiments, a MAC address is an identifier that is burned into a read only memory of a network interface card. However, MAC addresses may be spoofed in some devices, which may enable a malicious or unauthorized device to pose as the intended device. Similarly, any device connected to a network may be assigned an IP address.

Because the network boot server 204 may use an encrypted command that may be decrypted only by the true device associated with the MAC address, IP address, or other identifier, the network boot server 204 may authenticate the device 202 prior to responding to the network boot request.

It is not uncommon for network administrators to use MAC spoofing to attempt to masquerade one device in place of another. For example, when a device fails and is replaced with another device, a shortcut may be to use the same MAC address as the first device so that network communications that use the MAC address will continue as previously. Such practices are generally not advised as configuration management systems and other management tools can be confused and rendered ineffective.

When a network boot request may be received by a network interface 212 on the network boot server 204. The network interface 212 may be any type of connection to the network 206. Some instances of a network interface 212 may include different physical connections along with various protocol translators and other software or firmware processing components.

A pre-boot communications engine 214 may process various communications with the device 202 during the course of a pre-boot sequence and, in some cases, during the provisioning of the device 202. The pre-boot communication engine 214 may be a software service, hardware component, firmware device, or any other physical or computing mechanism for performing the functions described.

The pre-boot communications engine 214 may use the identifier 210 to contact a configuration server 218, which may refer to a configuration database 220, to receive a public encryption key. The public encryption key may be used to encrypt a command sequence 222 using an encryption mechanism 224, and the encrypted command may be transmitted to the device 202.

The public encryption key may be stored in the configuration database 220. In many embodiments, the public encryption key may be stored in the configuration database through a bill of materials that may be created when the device 202 was manufactured. In some cases, a reseller, systems integrator, or a third party may determine the public encryption key for the device 202 and transmit the public encryption key along with an identifier to the configuration database 220.

The configuration server 218 may be a server or service that may monitor various devices on the network 206. In an enterprise management situation, the configuration server 218 may keep track of the status and performance of devices attached to the network 206 and may, in some instances, perform various management operations. For example, the configuration server 218 may contain a record in the configuration database 220 that defines how the device 202 is to be configured, including the operating system and any applications that execute on the device 202.

The network resource server 216 may provide authentication and authorization for the device 202. The network resource server 216 may have a record associated with the device 202 such as a group or other management object to which the device 202 may belong. The network resource server 216 may, in some cases, define various policies that may determine how an operating system and various applications may perform on the device 202.

When the device 202 is installed or otherwise joined to the network 206, a record for the device may be created in the configuration database 220 and sometimes with the network resource server 216. These records may determine how the device 202 is to be configured and how the device may behave. In order for the authentication mechanisms to operate, the public encryption key may be installed in the configuration database 220 prior to the network boot request from the device 202. In cases where a device 202 does not have a record in the configuration database 220 or is not defined in the network resource server 216, the device 202 may be placed in a waiting state until such time as the records in the configuration database 220 and network resource server 216 are updated.

The public encryption key may be used to authenticate the device 202. An encrypted command may be transmitted across the network 206 to the device 202. The network boot communicator 208 may receive the encrypted command, transfer the command to a security device 226 that may use a private encryption key 228 to decrypt the command. The command may generate a response to the network boot server 204 and thus may authenticate the device 202 to the network boot server 204.

The security device 226 may be a Trusted Platform Module in some embodiments. In other embodiments, the security device 226 may contain a unique private encryption key 228 and be configured to decrypt a communication with the network boot server 204 prior to receiving bootable executable instructions.

In some embodiments, the security device 226 may have an ownership status 230 that may be set by a network boot server 204 or other device. The ownership status 230 may define a device or group of devices that have authority to perform various operations, including serving bootable code and modifying various settings within the device 202.

Among the initial encrypted commands that may be transmitted from the network boot server 204 to the device 202 may be a query as to the ownership status 230 and, in some cases, a command to set the ownership status 230 to be the network boot server 204.

When an ownership status 230 is set to another device, the ownership status 230 may include an authentication mechanism through which the other device may be positively authenticated to the device 202. In some cases, such an authentication mechanism may include an identifier, a public encryption key, a Globally Unique Identification (GUID) or some other mechanism.

After authenticating the device 202 to the network boot server 204, the network boot server 204 may serve boot code 234 and an operating system 236 to the device 202. The boot code 234 may be the initial executable instructions that may be executed by the device 202 to start up the device 202 and begin loading the operating system 236. Once the operating system 236 has been loaded and begins communication through the network 206, various applications 240 may be loaded onto the device 202 and executed. One or more provisioning servers 238 may provide the operating system 236 and applications 240.

In one example using current technology, the device 202 may generate a request using a Preboot eXecution Environment (PXE) boot request. A PXE boot request may comprise a firmware action that attempts to locate a PXE redirection service, such as Proxy DHCP, in order to receive information about available PXE servers. After parsing the answer, the firmware may ask an appropriate boot server for a Network Bootstrap Program (NBP).

Following the example, the network boot communicator 208 may use PXE compliant communication protocols. The pre-boot communication engine 214 may generate a Network Bootstrap Program using the command sequences 222 and the encryption mechanism 224 to create and transmit commands to the device 202. After one or more interactions, a Network Bootstrap Program may be created that directs the device 202 to communicate with a provisioning server 238 to download and execute the boot code 234, operating system 236, and applications 240.

In such an example, the NBP protocol may be used to communicate with the device 202 in the PXE mode to access the Trusted Platform Module or other security device 226 to establish authenticity prior to transmitting licensed software or other data to the device 202.

Figure 3:
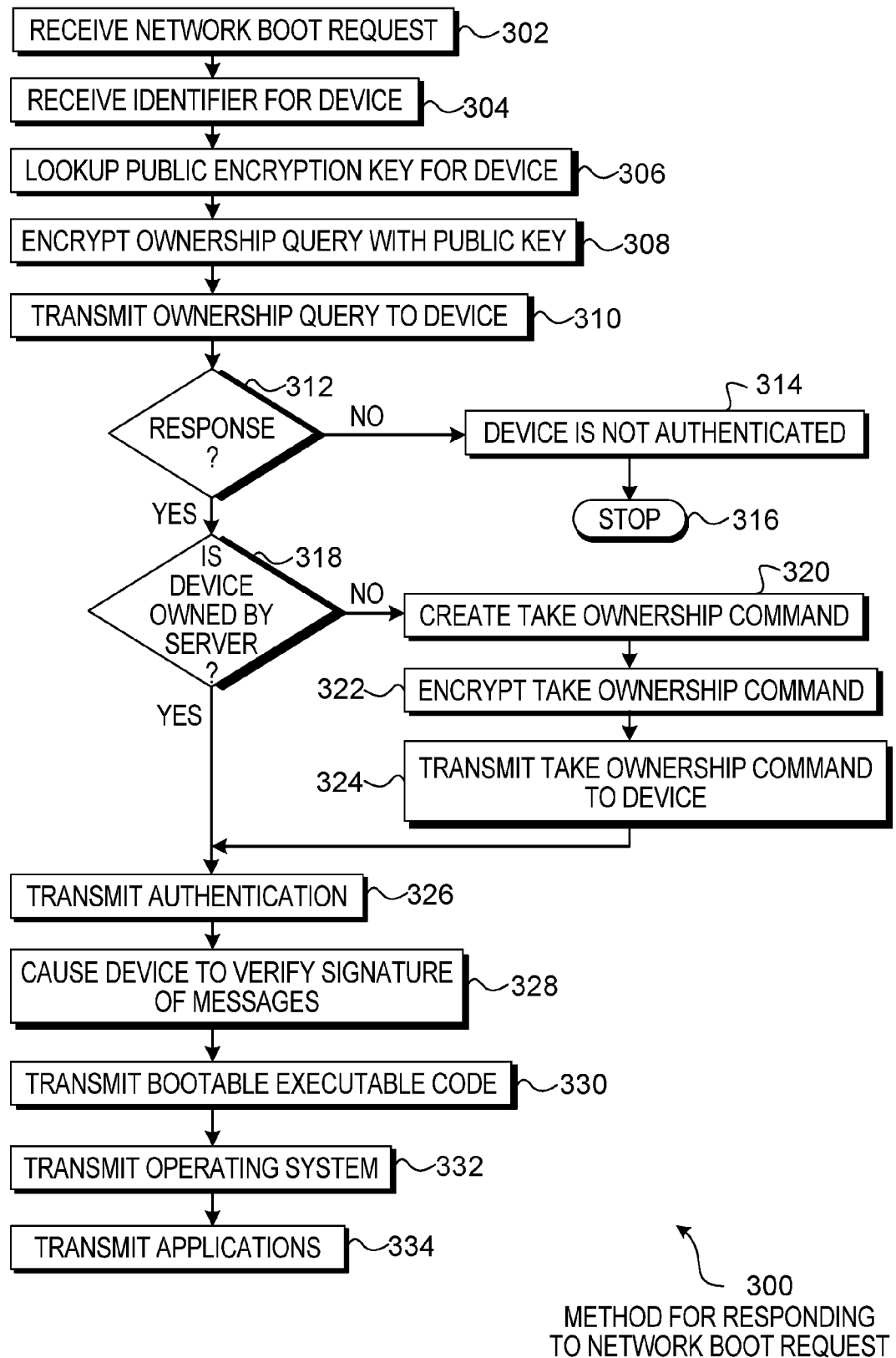
FIG. 3 is a flowchart illustration of an embodiment showing a method for responding to a network boot request.

FIG. 3 is a flowchart illustration of an embodiment 300 showing a method for responding to a network boot request. Embodiment 300 is a simplified example of a sequence that may be used by a network boot server to authenticate a requesting device and serve bootable instructions, operating systems, and applications to the device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of several of the processes and procedures discussed throughout this specification for handling a network boot request, performing various authentication actions, and serving the network boot request after authentication is proper. Embodiment 300 uses an encrypted ownership command to determine if the device is authenticated. Other embodiments may use different commands or perform different sequences, but may use a response from an encrypted command to verify that the device is authentic since only the device may be capable of decrypting a command that was encrypted using the corresponding public encryption key.

A network boot request may be received in block 302, and an identifier for the device may be received in block 304. In many cases, the request and identifier may be accompanied in a single transmission. In other cases, two or more transmissions may be used to communicate the request and identifier.

Using the identifier, a public encryption key may be looked up for the device in block 306. In many cases, a configuration database or other mechanism may be used to store a record of the public encryption key associated with identifiers for various devices. In some cases, the database may include the identifier received from the device, while in other cases the identifier in the database may be derived from another database, lookup table, or record.

The public encryption key may be used to encrypt an ownership query in block 308 and may be transmitted to the device in block 310.

If no response is received in block 312, the device may not be authenticated in block 314, as the device may not have been able to decrypt and act on the query of block 308. In such a case, the process may be halted in block 316.

If a response is received in block 312 and the device is not owned by the server in block 318, a take ownership command may be created in block 320, encrypted in block 322, and transmitted in block 324. In many cases, the take ownership command may include an authentication mechanism for the server executing the method of embodiment 300.

If the device were executing its first network boot request, the ownership of the device may be undefined. If the device were relocated from another location or previously used in another installation, the ownership may be set to a different server. In either case, the take ownership command may enable the server executing embodiment 300 to establish a trusted and authenticated session for the current use and subsequent uses of a network boot request.

In block 326, authentication may be transmitted to the device and the device may be caused to verify a message signature or other authentication in block 328. Such authentication may function to assert ownership privileges with the device and enable the network boot process to continue.

In some embodiments, the server may be authenticated to the device by using the server's public encryption key to generate a response. The server may decrypt the message and respond, thus authenticating the server to the device.

The bootable executable code may be transmitted in block 330, after which an operating system may be transmitted in block 332, and various applications may be transmitted in block 334, thus satisfying the network boot request.

In many embodiments, a device may use a network boot request for the initial provisioning and configuration of the device. The operating system and applications may be stored locally and may be executed from the local store in subsequent uses of the device. In other embodiments, the device may perform a network boot request for each time the device is powered on and connects to the network.

In an embodiment using current technology, the request in block 302 may be a PXE request that is directed to the server performing the method of embodiment 300. The ownership commands that are created in blocks 308 and 320 may be NBP sequences that may be evaluated with a Trusted Platform Module.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer system, the computer system comprising:
a processor;
system memory, the system memory coupled to the processor, the system memory storing instructions that are executable by the processor; and
the processor executing the instructions stored in system memory to:
access a command, the command to request establishment of a relationship between the computer system and a device, establishment of the relationship preventing other devices from being able to perform network boot sequences with the device;

transmit the command to the device;
receive a response indicative of the device having at least attempted to perform the command; and
transmit boot software to the device based at least in part on the response, the boot software for booting up the device.

2. The computer system of claim 1, further comprising instructions executed at the processor to receive a boot request from the device; and
wherein instructions executed at the processor to access a command comprise instructions executed at the processor to access a command responsive to the received boot request from the system memory.

3. The computer system of claim 2, wherein instructions executed at the processor to receive a boot request from the device comprise instructions executed at the processor to receive a broadcast transmission over a network.

4. The computer system of claim 3, further comprising instructions executed at the processor to:
use an identifier to look up a public key for the device in a database; and
encrypt the command with the public key to create an encrypted command.

5. The computer system of claim 4, wherein instructions executed at the processor to transmit the command to the device comprise instructions executed at the processor to transmit the encrypted command to the device.

6. The computer system of claim 5, wherein instructions executed at the processor to receive a response indicative of the device having at least attempted to perform the command comprise instructions executed at the processor to receive a response indicating that the device is capable of decrypting the encrypted command.

7. The computer system of claim 1, wherein instructions executed at the processor to transmit the command and receive a response comprises instructions executed at the processor to participate in an authentication exchange with the device.

8. The computer system of claim 7, wherein instructions executed at the processor to participate in an authentication exchange with the device comprise instructions executed at the processor to:
transmit an ownership query to the device;
receive a response back from the device;
determine that the device is not owned by any network boot server based on the received response; and
take ownership of the device.

9. The computer system of claim 8, wherein instructions executed at the processor to participate in an authentication exchange with the device comprise instructions executed at the processor to determining that the device is not an interloper device.

10. The computer system of claim 9, wherein instructions executed at the processor to determine that the device is not an interloper device comprises instructions executed at the processor to determine that the device is authorized to receive the boot software.

11. The computer system of claim 1, wherein instructions executed at the processor to receive a response indicative of the device having at least attempted to perform the command comprises instructions executed at the processor to receive a response indicative of the remote device having generated an outcome for the command.

12. The computer system of claim 1, further comprising instructions executed at the processor to transmit one or more of: an operating system or an application to the device.

13. The computer system of claim 1, wherein instructions executed at the processor to access a command comprise instructions executed at the processor to access a command derived from one or more pre-boot command sequences.

14. A processor implemented method for use at a computer system, the processor implemented method for configuring a device to boot, the processor implemented method comprising:
accessing a command from system memory, the command to request establishment of a relationship between the computer system and a device, establishment of the relationship preventing other devices from being able to perform network boot sequences with the device;
transmitting the command to the device;
receiving a response indicative of the device having at least attempted to perform the command; and
transmitting boot software from system memory to the device based at least in part on receiving the response, the boot software for booting up the device.

15. The method of claim 14, wherein accessing a command comprises accessing a command in response to receiving a boot request from the device, the boot request received in a broadcast transmission over a network.

16. The method of claim 14, wherein transmitting the command to the device comprises:
using an identifier to look up a public key for the device in a database;
encrypting the command with the public key to create an encrypted command; and
transmitting the encrypted command to the device.

17. The method of claim 14, wherein receiving a response indicative of the device having at least attempted to perform the command comprises receiving a response indicative of the remote device having generated an outcome for the command.

18. The method of claim 14, further comprising transmitting one or more of: an operating system or an application to the device.

19. The method of claim 14, wherein accessing a command comprises accessing a command derived from one or more pre-boot command sequences.

20. A computer program product for use at a computer system, the computer program product for implementing a method for configuring a device to boot, the computer program product comprising one or more computer hardware storage devices having stored thereon computer-executable instructions that, when executed at a processor, cause the computer system to perform the method, including the following:
access a command, the command to request establishment of a relationship between the computer system and a device, establishment of the relationship preventing other devices from being able to perform network boot sequences with the device;
transmit the command to the device;
receive a response indicative of the device having at least attempted to perform the command; and
transmit boot software to the device based at least in part on the response, the boot software for booting up the device.

* * * * *